(12) United States Patent
Baiju et al.

(10) Patent No.: US 11,554,814 B2
(45) Date of Patent: Jan. 17, 2023

(54) VEHICLE BODY SIDE STRUCTURE

(71) Applicant: Honda Motor Co., Ltd., Tokyo (JP)

(72) Inventors: Kodai Baiju, Tokyo (JP); Hiroyuki Sakai, Tokyo (JP); Yasunobu Ogawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/471,132

(22) Filed: Sep. 9, 2021

(65) Prior Publication Data

US 2022/0111903 A1 Apr. 14, 2022

(30) Foreign Application Priority Data

Oct. 14, 2020 (JP) .............................. JP2020-173506

(51) Int. Cl.
*B62D 25/04* (2006.01)
*B62D 21/15* (2006.01)
*B62D 25/02* (2006.01)

(52) U.S. Cl.
CPC ............ *B62D 25/04* (2013.01); *B62D 21/157* (2013.01); *B62D 25/02* (2013.01)

(58) Field of Classification Search
CPC ........ B62D 25/02; B62D 25/04; B62D 25/06; B62D 25/025; B62D 27/023; B62D 21/157

USPC .......... 296/193.06, 29, 30, 210, 209, 187.12
See application file for complete search history.

(56) References Cited

FOREIGN PATENT DOCUMENTS

| JP | 2004314845 | | 11/2004 |
| JP | 2010013022 | | 1/2010 |
| JP | 5811762 B2 | * | 11/2015 |
| KR | 200155890 Y1 | * | 6/1999 |
| KR | 20010049950 A | * | 6/2001 |

* cited by examiner

*Primary Examiner* — Dennis H Pedder
(74) *Attorney, Agent, or Firm* — JCIPRNET

(57) ABSTRACT

Provided is a vehicle body side structure capable of improving electrodeposition coating of a center pillar, ensuring sealability of door seal members, and further ensuring strength and rigidity. The vehicle body side structure includes front flange bulging portions and rear flange bulging portions on a center pillar inner panel. Further, a center pillar stiffener has front through holes and rear through holes communicating with a first closed cross section. A center pillar outer panel includes front and rear step passages and that communicate the front and rear through holes with a second closed cross section. The center pillar stiffeners is overlapped with the front bulging portions and the rear flange bulging portions so as to form front gap passages and rear gap passages that communicate the first closed cross section with the outside.

14 Claims, 12 Drawing Sheets

VEHICLE BODY SIDE STRUCTURE

CROSS-REFERENCE TO RELATED APPLICATION

This application claims the priority benefits of Japanese application no. 2020-173506, filed on Oct. 14, 2020. The entirety of the above-mentioned patent application is hereby incorporated by reference herein and made a part of this specification.

BACKGROUND

Technical Field

The disclosure relates to a vehicle body side structure.

Description of Related Art

As a vehicle body side structure, for example, there is known a configuration in which a closed cross section is formed by an outer panel and an inner panel of a center pillar, a reinforcing member is provided in an internal space between the panels, and the internal space between the panels is divided into two closed cross sections by the reinforcing member. The two closed cross sections are formed at the inner side and the outer side in the vehicle width direction. According to this center pillar, by providing the reinforcing member inside the closed cross section, the rigidity and strength against a load (hereinafter referred to as a side collision load) input by, for example, a side collision are ensured, and the side collision load can be supported by the center pillar (see Citation 1, for example).

Further, as a front pillar of the vehicle, there is known a configuration in which a gap flow path is formed between a flange of an outer panel and a flange of an inner panel. According to the front pillar, electrodeposition liquid can be guided from one gap flow path to an internal space of one closed cross section, and the inner surface of the front pillar can be electrodeposited so as to suppress the generation of rust (for example, see Patent Literature 2).

RELATED ART

Patent Literature

[Patent Literature 1] Japanese Patent Laid-Open No. 2004-314845
[Patent Literature 2] Japanese Patent Laid-Open No. 2010-13022

SUMMARY

Problems to be Solved

However, in the vehicle body side structure of Citation 1, it is difficult to carry out electrodeposition coating of the internal space formed by the outer panel and the inner panel of the center pillar by guiding the electrodeposition liquid into the internal space having two closed cross sections by using the reinforcing member. This is because the strength decreases when the through holes through which the electrodeposition liquid passes through the reinforcing member are opened.

As a countermeasure, it is conceivable to apply the gap flow path of the front pillar of Patent Literature 2 to the vehicle body side structure of Patent Literature 1. However, since the gap passage of Patent Literature 2 is one single gap passage formed between the outer panel and the inner panel, when the internal space of the center pillar is divided into two closed cross sections, one at the inner side and one at the outer side in the vehicle width direction, by a reinforcing member, two gap passages must be formed for each of the two closed cross sections. For this reason, it is conceivable that the flange thickness of the center pillar increases, and it becomes difficult to ensure sealability due to the deterioration of the mountability of door seal members attached to the flange as well as the unevenness of the mounting surface.

Means for Solving the Problems

As another measure, it is conceivable to form a gap passage between the inner panel and a reinforcing member in the vehicle width direction so as to guide the electrodeposition liquid and to form an opening portion in the inner reinforcing member so as to guide the electrodeposition liquid from the closed cross section at the inner side to the closed cross section at the outer side. However, once the opening portion is formed in the reinforcing member, there is a possibility that the rigidity and strength of the center pillar against side collision loads will be reduced.

An object of the disclosure is to provide a vehicle body side structure capable of improving electrodeposition coating of a center pillar, ensuring sealability of the door seal members, and further ensuring strength and rigidity.

Effects

In order to solve the above problems, the disclosure proposes the following.

(1) A vehicle body side structure (such as a vehicle body side structure 10 of the embodiment) according to the disclosure is provided including a center pillar (such as a center pillar 25 of the embodiment), wherein a reinforcing member (such as a center pillar stiffener 47 of the embodiment) is sandwiched between an inner panel (such as a center pillar inner panel 45 of the embodiment) at an inner side in a vehicle width direction and an outer panel (such as a center pillar outer panel 46 of the embodiment) at an outer side in the vehicle width direction, a first closed cross section (such as a first closed cross section 51 of the embodiment) is formed at the inner side in the vehicle width direction by the inner panel and a reinforcing member, and a second closed cross section (such as a second closed cross section 52 of the embodiment) is formed at the outer side in the vehicle width direction by the outer panel and the reinforcing member; wherein the inner panel bulges toward the inner side in the vehicle width direction with respect to the reinforcing member and includes bulging portions (such as front flange bulging portions 73 and rear flange bulging portions 74 of the embodiment) where the reinforcing member is overlapped; the reinforcing member has through holes (such as front through holes 101 and rear through holes 102 of the embodiment) communicating with an internal space (such as a first internal space 53 of the embodiment) of the first closed cross section; the outer panel bulges toward the outer side in the vehicle width direction with respect to the reinforcing member and includes step passages (such as a front step passage 85 and a rear step passage 86 of the embodiment) through which the through holes are communicated with an internal space of the second closed cross section (such as a second internal space 54 of the embodiment); and gap passages (such as front gap passages 105 and rear gap passages 106 of the embodiment) are provided communicating the first closed cross section to the outside by overlapping the reinforcing member with the bulging portions of the inner panel.

According to such configuration, a first closed cross section is formed by the inner panel and the reinforcing member, and the internal space of the first closed cross section is communicated to the outside by the gap passages. Further, the gap passages may communicate the internal space of the second closed cross section to the outside through the internal spaces of the first closed cross section, the through holes, and the step passages.

Thus, for example, by immersing the vehicle body side structure (i.e. the center pillar) into the electrodeposition liquid, the electrodeposition liquid can flow from the outside of the center pillar into the internal space of the first closed cross section through the gap passages. Further, the electrodeposition liquid may flow from the outside of the center pillar into the internal space of the second closed cross section through the gap passages, the through holes, and the step passages. Therefore, the electrodeposition liquid can be satisfactorily filled inside the center pillar, and the electrodeposition coating can be satisfactorily applied to every corner inside the center pillar. Further, in the case of insertion into the electrodeposition tank from the lower end of the center pillar, the flow of the electrodeposition liquid is opposite to that described above, but for ease of explanation, the flow of the electrodeposition liquid is described as above.

Also, the gap passages can be formed only by forming the bulging portions on the inner panel, and there is no need to form the bulging portions on the outer panel at the outer side in the vehicle width direction. Therefore, the outer panel can form a flat door seal mounting surface at the outer side in the vehicle width direction. By providing a door seal member on the door seal mounting surface, the sealability of the door seal member with respect to the door seal mounting surface can be secured.

(2) The gap passages, the through holes, and the step passages are formed at a front flange (such as a front flange 27 of the embodiment) of the center pillar at the front of the vehicle body and a rear flange (such as a rear flange 28 of the embodiment) of the center pillar at the rear of the vehicle body.

According to such configuration, the gap passages, the through holes, and the step passages are formed on both the front flange and the rear flange of the center pillar. Therefore, even if the gap passages, the through holes, and the step passages are made small, the electrodeposition liquid can be satisfactorily filled inside the center pillar. As a result, for example, while ensuring the strength and rigidity against the side collision load input to the center pillar, electrodeposition coating can be satisfactorily applied to in every corner inside the center pillar.

(3) The gap passages are formed in plurality at determined intervals in a vertical range from an insertion opening portion (such as an insertion opening portion 65 of the embodiment) of a seatbelt retracting device formed at a lower portion of the center pillar to a roof side rail (such as a roof side rail 26 of the embodiment).

Here, the insertion opening portion of the seatbelt retracting device is opened in a relatively large shape. Therefore, the electrodeposition liquid can be sufficiently flowed into the center pillar through the insertion opening portion. For this reason, it is not necessary to form the gap passages at the bottom of the center pillar. Therefore, in such configuration, multiple gap passages are formed at predetermined intervals in the vertical range from the insertion opening portion to a roof side rail.

Further, by eliminating the need for the front gap passages 105 and the rear gap passages 106, the through holes can be reduced or eliminated from the reinforcing member at a position corresponding to the insertion opening portion. In this state, the electrodeposition liquid can be sufficiently flowed from the insertion opening portion at the lower portion of the center pillar to every corner inside the center pillar at the upper portion.

(4) The through holes may be formed in plurality in a manner of gradually increasing in size toward the lower portion of the center pillar.

Here, the center pillar is formed with a large closed cross section toward the lower portion. Therefore, in such configuration, the diameters of the through holes are gradually increased toward the lower portion of the center pillar. As a result, the inflow amount of the electrodeposition liquid into the center pillar can be secured.

(5) The step passages may be formed in a manner of gradually increasing in size in a front-rear direction of the vehicle body toward the lower portion of the center pillar in accordance with the through holes.

According to such configuration, by forming the step passages in accordance with the diameters of the through holes, in a manner of gradually increasing in size toward the lower portion of the center pillar, the inflow amount of the electrodeposition liquid into the inside of the center pillar can be secured.

(6) The gap passages are formed in plurality in the vertical direction, and the inner panel, the reinforcing member, and the outer panel, may be bonded between the adjacent gap passages.

The step passages extend in a longitudinal direction of the center pillar but do not interfere with the joinings because the extensions begin from the through holes rather than the free ends of the flanges.

According to such configuration, the inner panel, the reinforcing member, and the outer panels are joined between the adjacent gap passages. As a result, the joining strength of the center pillar can be secured, and for example, the strength and rigidity against the side collision load input to the center pillar can be secured.

(7) Fixing portions (such as a fixing portion 112a and a fixing portion 113a of the embodiment) of door seal members (such as a first door seal member 112 and a second door seal member 113 of the embodiment) are provided at the center pillar, and the step passages may include step portions (such as a front step portion 85a and a rear step portion 86a of the embodiment) with which the fixing portions abut.

According to such configuration, by abutting the fixed portions of the door seal members against the step portions of the step passages, the door seal members can be securely fixed to the flange, and the sealability (sealing property) between the center pillar and the door seal members can be improved.

(8) The center pillar may include a door hinge fixing portion (such as a door hinge fixing portion 121 of the embodiment) to which door hinges are attached, and wherein the reinforcing member may include other bulging portions (such as stiffener flange bulging portions 123 of the embodiment) that bulge toward the gap passages (such as stiffener gap passages 124 of the embodiment) with respect to the outer panel at a portion corresponding to the door hinge fixing portion, and the other gap passages are provided communicating with the step passages and the outside by overlapping the other panel with the other bulging portions.

Here, in the door hinge fixing portion, for example, the flange width of the reinforcing member is formed short so as to attach the door hinges, and the reinforcing member is in contact with or close to the outer panel. Therefore, it is difficult to ensure the fluidity of the electrodeposition liquid at the step passage corresponding to the door hinge fixing portion.

In this way, the flange width is small (short), the step passage cannot be formed sufficient. Therefore, in such configuration, the other bulging portions are formed at a portion corresponding to the door hinge fixing portion in the reinforcing member and the other panel is overlapped with the other bulging portions so as to form other gap passages. As a result, the fluidity of the electrodeposition liquid can be secured in the step passage corresponding to the door hinge fixing portion by communicating the step passage to the outside through the other gap passages.

(9) The center pillar includes the door seal member (such as the second door seal member 113 of the embodiment) at a first portion (such as a first portion 126 of the embodiment) where the gap passages are formed and a second portion (such as a second portion 127 of the embodiment) where the other gap passages and the gap passages are formed, and a width of second portion in the vehicle width direction (such as a width W2 of the embodiment) may be the same as a width of the first portion in the vehicle width direction (such as a width W1 of the embodiment).

According to such configuration, the gap passages are formed in the first portion, and the other gap passages and the gap passages are formed in the second portion. Further, the width of the second portion in the vehicle width direction is made the same as the width of the first portion in the vehicle width direction. Thus, in the case where the door seal member is provided in the first portion and the second portion, or in a state where the door seal member is provided, the mountability (such as sealability) of the door seal member can be well ensured.

(10) The center pillar is fixed to a roof side reinforcing member (such as a roof side stiffener 38 of the embodiment) of the roof side rail (such as the roof side rail 26 of the embodiment) and a side sill reinforcing member (such as a side sill stiffener 33 of the embodiment) of a side sill (such as a side sill 21 of the embodiment), and includes a front reinforcing flange (such as a stiffener front flange 92 of the embodiment) and a rear reinforcing flange (such as a stiffener rear flange 93 of the embodiment) formed in the front-rear direction of the vehicle body, wherein the multiple through holes are formed in the vertical direction in the front reinforcing flange and the rear reinforcing flange.

According to this arrangement, the reinforcing member is fixed to the roof side reinforcing member of the roof side rail and the side sill reinforcing member of the side sill. Thus, the strength and rigidity of the vehicle body side (particularly the center pillar) can be improved, and the so-called side collision performance against a side collision can be improved. Further, multiple through holes are formed (drilled) in the front reinforcing flange and the rear reinforcing flange of the reinforcing member in the vertical direction. As a result, the electrodeposition liquid can smoothly flow into every corner of the center pillar.

(11) The reinforcing member may be formed into a hat-like cross section, the center pillar may include a column (such as a column 49 of the embodiment) of the first closed cross section formed by the reinforcing member and the inner panel, and the outer panel may be overlapped with the reinforcing member.

According to such configuration, the closed cross section column is formed by the reinforcing member and the inner panel, and the outer panel is overlapped with the reinforcing member (i.e. the column). As a result, the strength and rigidity of the vehicle body side (particularly the center pillar) can be improved, and the so-called side collision performance against a side collision can be improved.

(12) The reinforcing member has other through holes (such as top through holes 98 of the embodiment) formed at a top of the hat-like cross section (such as a stiffener top wall 95 of the embodiment), and another reinforcing member (such as a reinforcing plate 48 of the embodiment) is provided at a portion where a stress is concentrated due to a side collision in the reinforcing member.

According to such configuration, by forming the reinforcing member into a hat-like cross section, the top of the hat-like cross section ratio can be secured relatively large. Thus, the other through holes can be formed relatively large at the top of the hat-like cross section. Thus, for example, even if the second closed cross section formed by the reinforcing member and the outer panel is a narrow internal space, a sufficient amount of the electrodeposition liquid can be flowed into the inside of the second closed cross section.

Further, by providing the reinforcing member with another reinforcing member, the portion where the stress is concentrated due to the side collision can be reinforced by other reinforcing member. Thus, even if the other through holes are formed relatively large at the top of the hat-like cross section, the strength and rigidity of the reinforcing member (i.e. the center pillar) can be secured, and the deterioration of the so-called the side collision performance caused by a side collision can be compensated by the another reinforcing member.

(13) The reinforcing member is disposed inside a roof side closed cross section (such as a second roof side closed cross section 43) formed by the side reinforcing member and an outer panel of the roof side rail (such as a roof side rail outer panel 37 of the embodiment), and the inner panel includes a discharge port portion (such as a discharge port portion 45a of the embodiment) that bulges toward the inner side in the vehicle width direction and opens toward the inner side in the vehicle width direction.

According to such configuration, the reinforcing member is disposed inside the roof side closed cross section. Further, the reinforcing member is fixed to the roof side reinforcing member. Therefore, the roof side closed cross section may be communicated with the second closed cross section of the center pillar. Moreover, the inner panel bulges toward the inner side in the vehicle width direction to form a discharge port portion that opens toward the inner side in the vehicle width direction.

Here, the electrodeposition liquid flows into the inside of the first closed cross section from the insertion opening portion of the seatbelt retracting device formed at the lower portion of the center pillar, and the inflow electrodeposition liquid is filled into the inside of the first closed cross section. A part of the electrodeposition liquid filled into the inside the first closed cross section is discharged from the discharge port portion of the inner panel to the outside of the inner side in the vehicle width direction.

Further, the remaining of the electrodeposition liquid filled into the inside the first closed cross section flows into the inside of the second closed cross section through the other through holes of the reinforcing member. The electrodeposition liquid filled inside the second closed cross section is discharged from the inside of the second closed cross section to the roof side closed cross section.

(14) The inner panel may include a pair of beads (such as a pair of beads 66 and 67 of the embodiment) and inner panel through holes (such as inner panel through holes 71 of the embodiment), the pair of beads (such as a pair of beads 66 and 67 of the embodiment) are disposed at interval in the front-rear direction of the vehicle body and extending in the vertical direction, and the inner panel through holes (such as inner panel through holes 71 of the embodiment) are formed in a groove portion (such as a groove portion 68 of the embodiment) between the pair of beads.

According to such configuration, the pair of beads is formed on the inner panel. Therefore, the strength and rigidity of the inner panel can be increased by the pair of beads. Accordingly, the strength and rigidity of the center pillar (i.e. the vehicle body side) can be improved, and the so-called side collision performance against the side collision can be improved.

Further, the inner panel through holes are formed in the groove portion between the pair of beads. Thus, the inner panel through holes can serve for both the inflow of the electrodeposition liquid into the center pillar and the discharge of the electrodeposition liquid from the inside of the center pillar.

BRIEF DESCRIPTION OF THE DRAWINGS

According to the disclosure, it is possible to improve the electrodeposition coating of the center pillar, ensure the sealability property of the door seal members, and further ensure the strength and rigidity.

DESCRIPTION OF THE EMBODIMENTS

Figure 1:
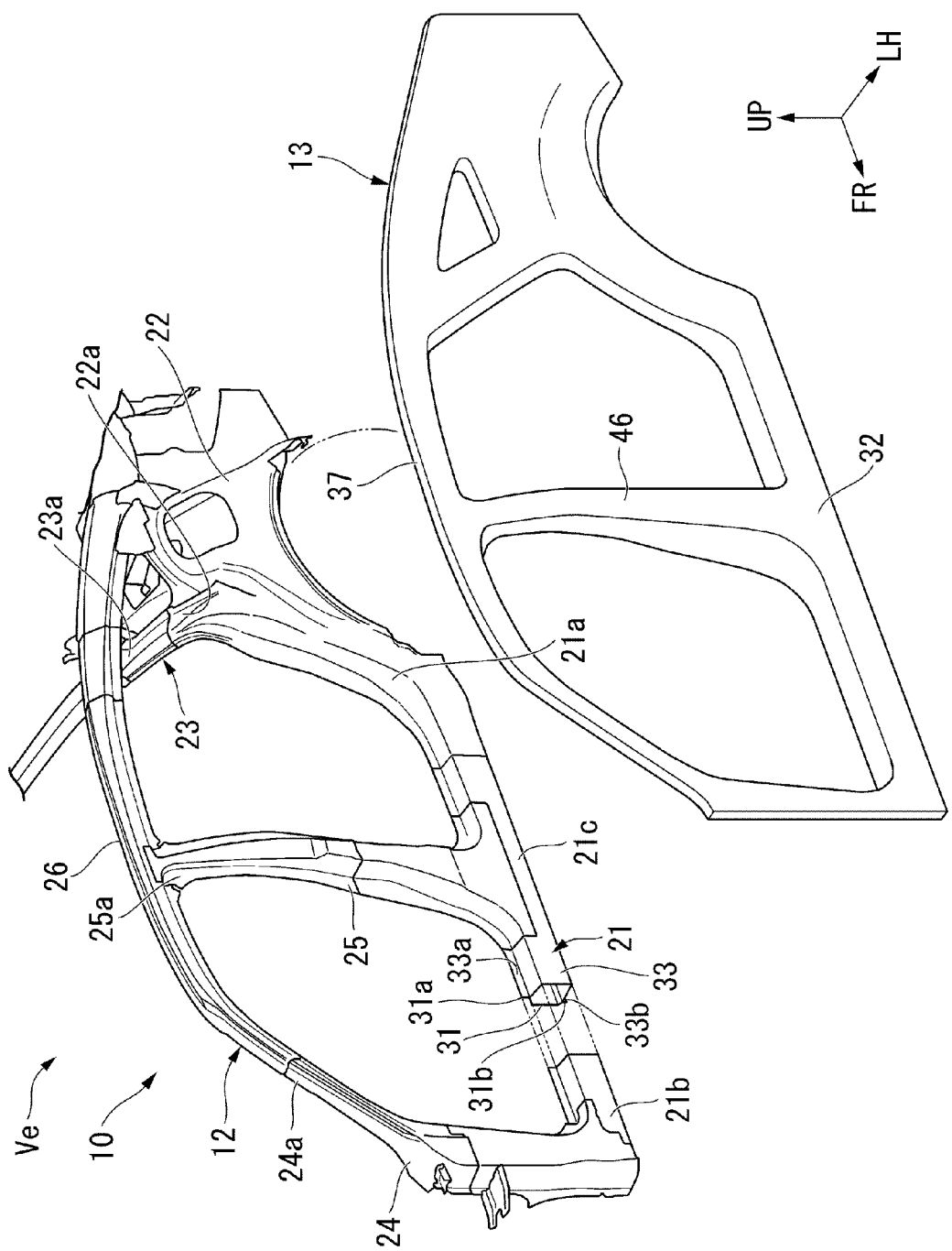

FIG. 1 is an exploded perspective view of a side panel outer from a vehicle body side structure according to an embodiment of the disclosure.

Figure 2:
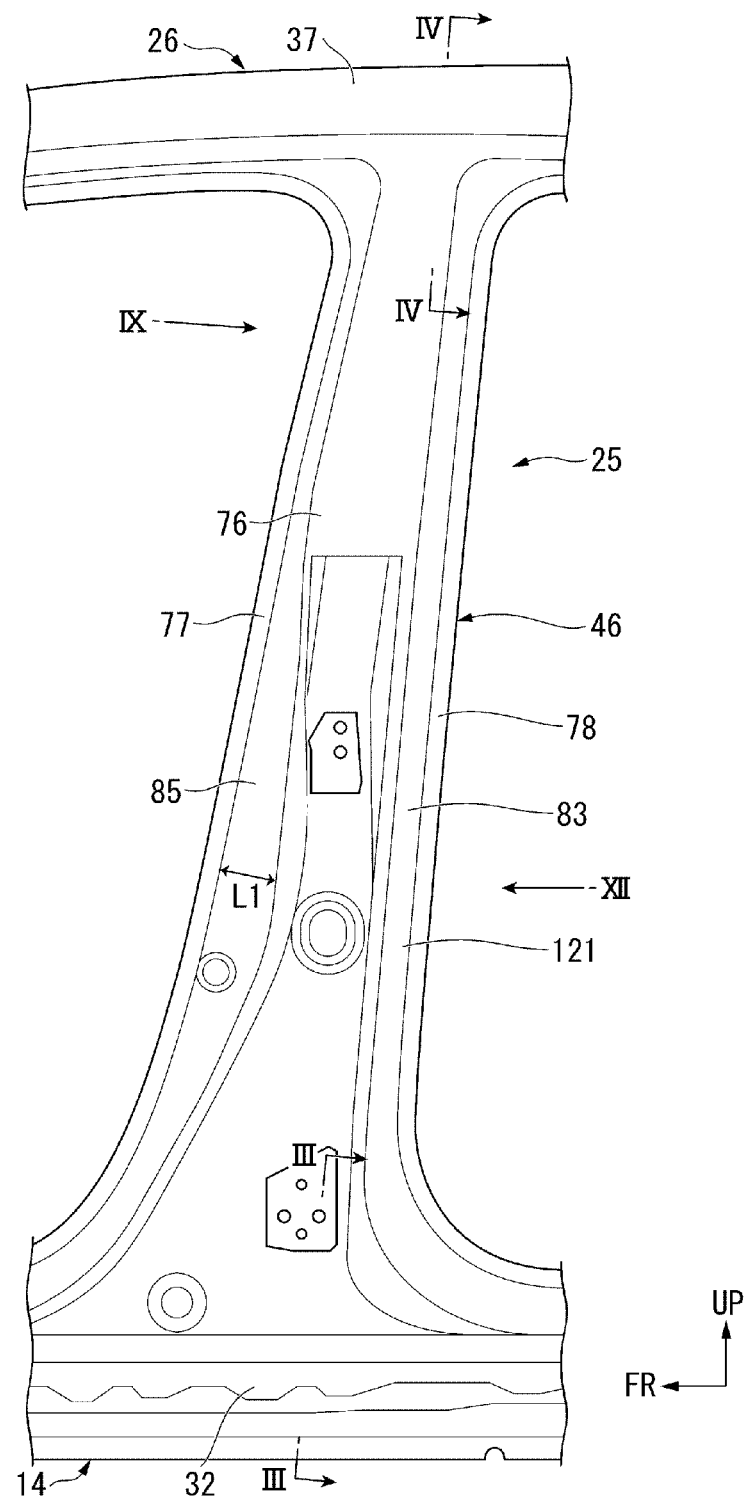

FIG. 2 is a side view of the center pillar of the vehicle body side structure of one embodiment as viewed from the left outer side.

Figure 3:
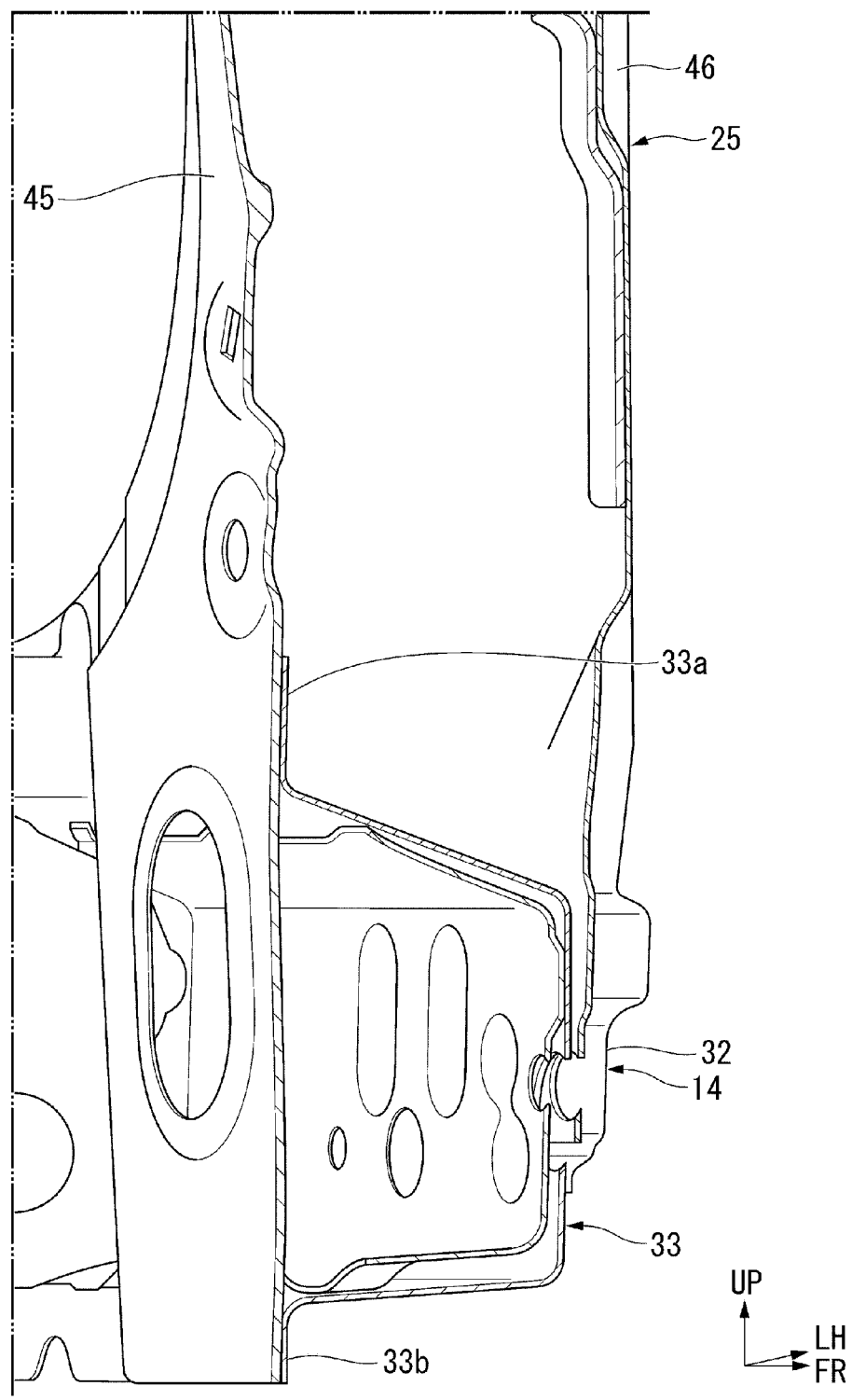

FIG. 3 is a cross-sectional view taken along the line III-III of FIG. 2.

Figure 4:
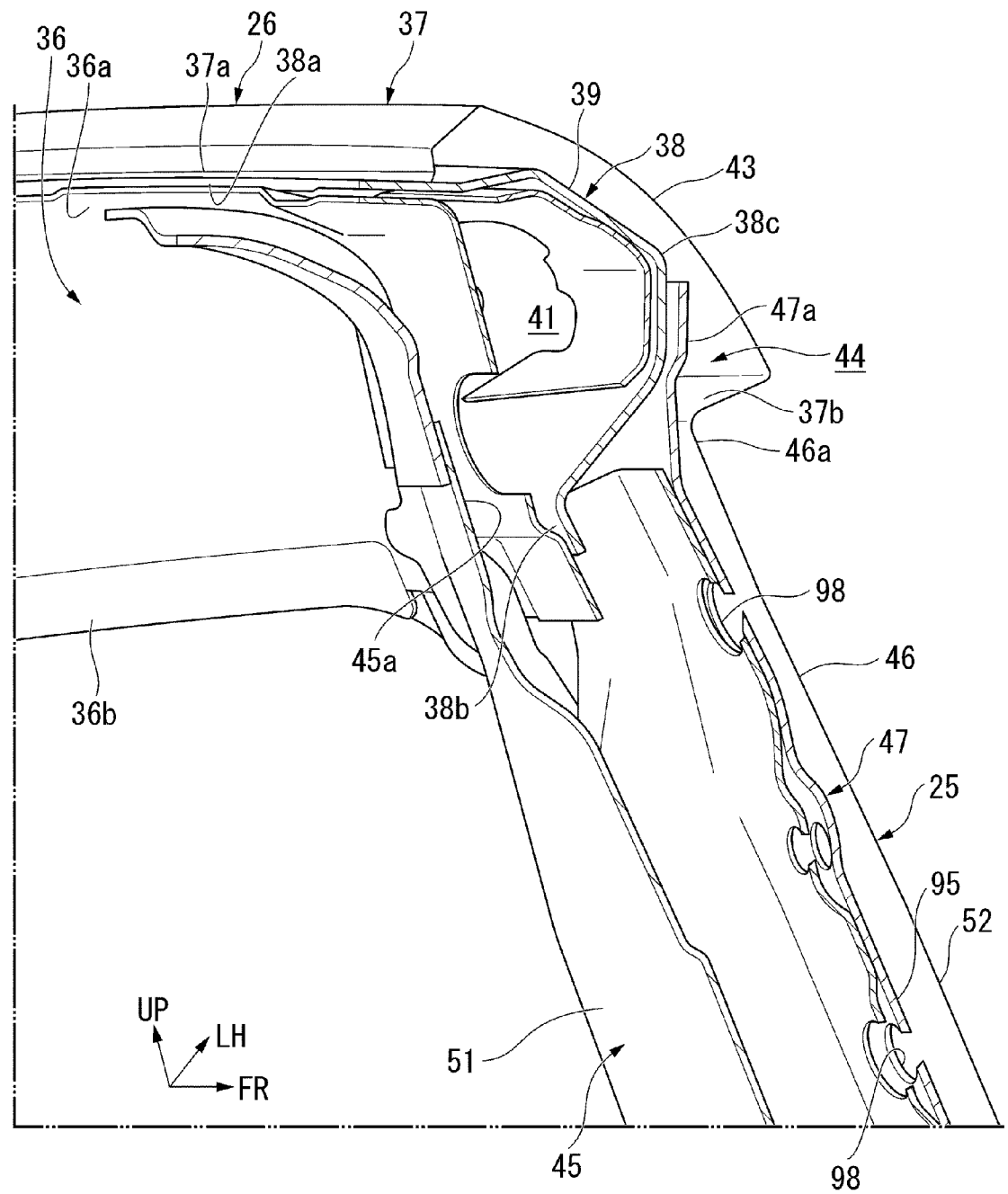

FIG. 4 is a perspective view taken along line IV-IV of FIG. 2.

Figure 5:
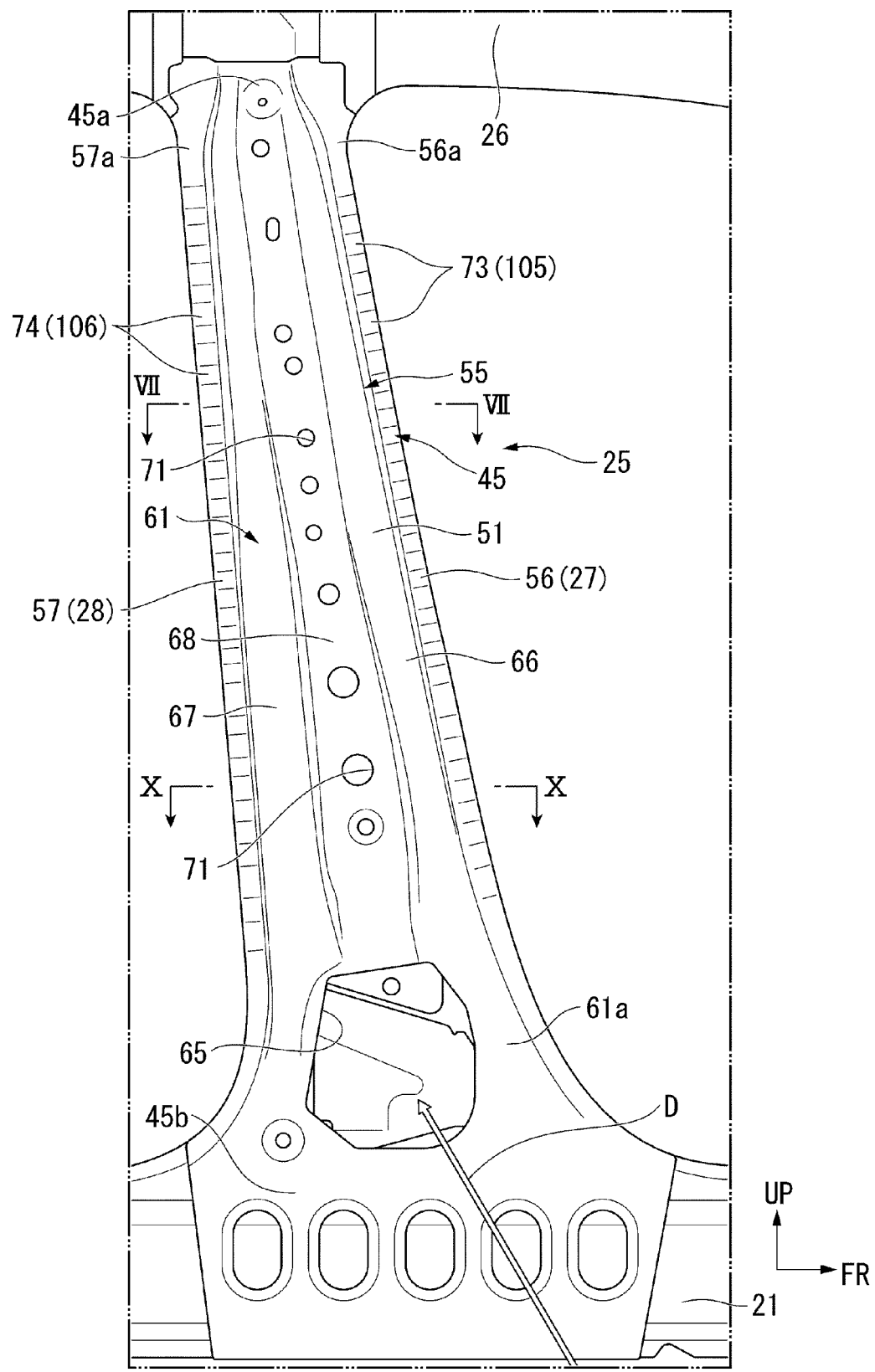

FIG. 5 is a side view of the center pillar of the vehicle body side structure of one embodiment as viewed from the left inner side.

Figure 6:
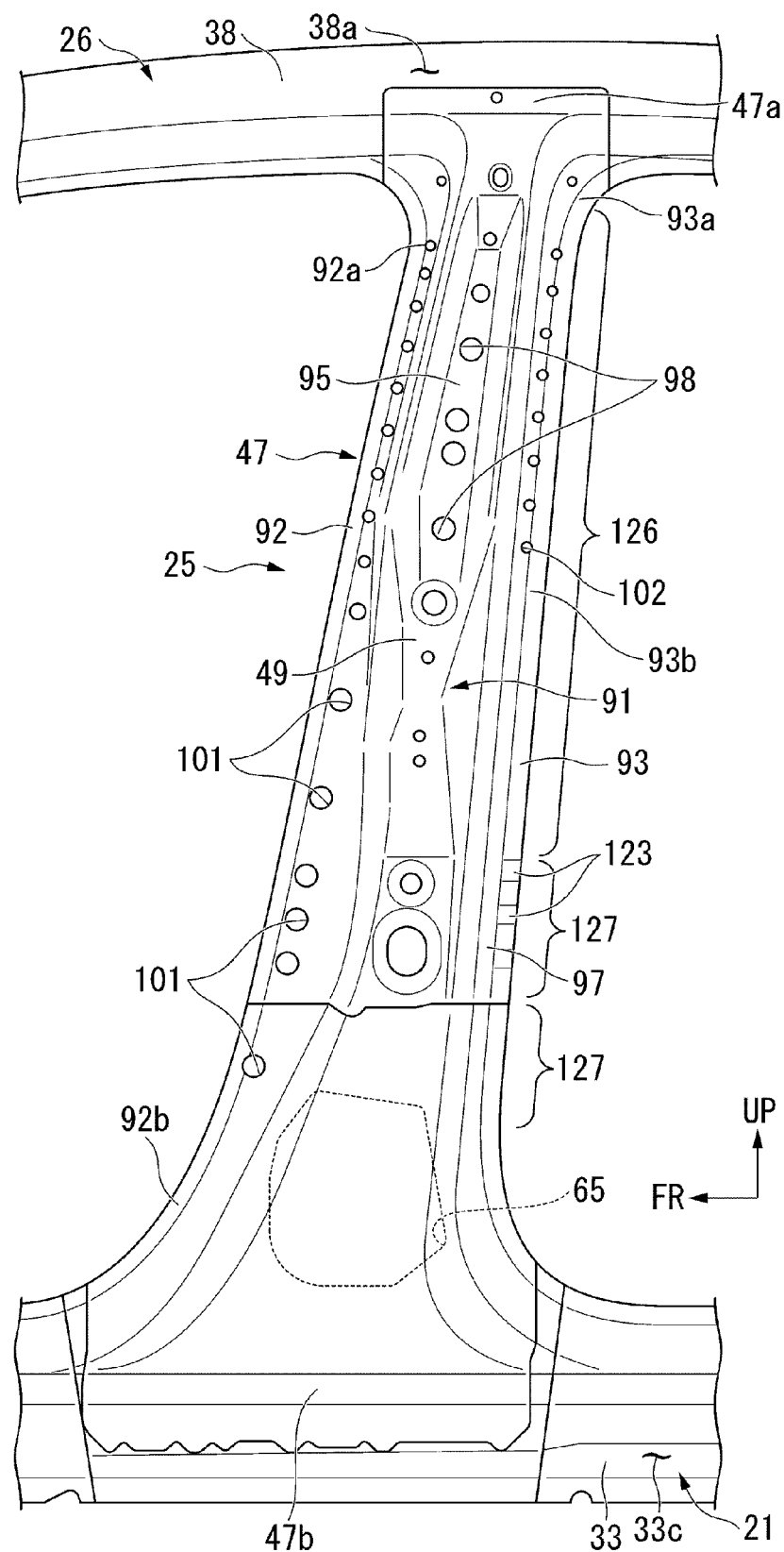

FIG. 6 is a side view the vehicle body side structure of FIG. 2 with a side panel outer removed.

Figure 7:
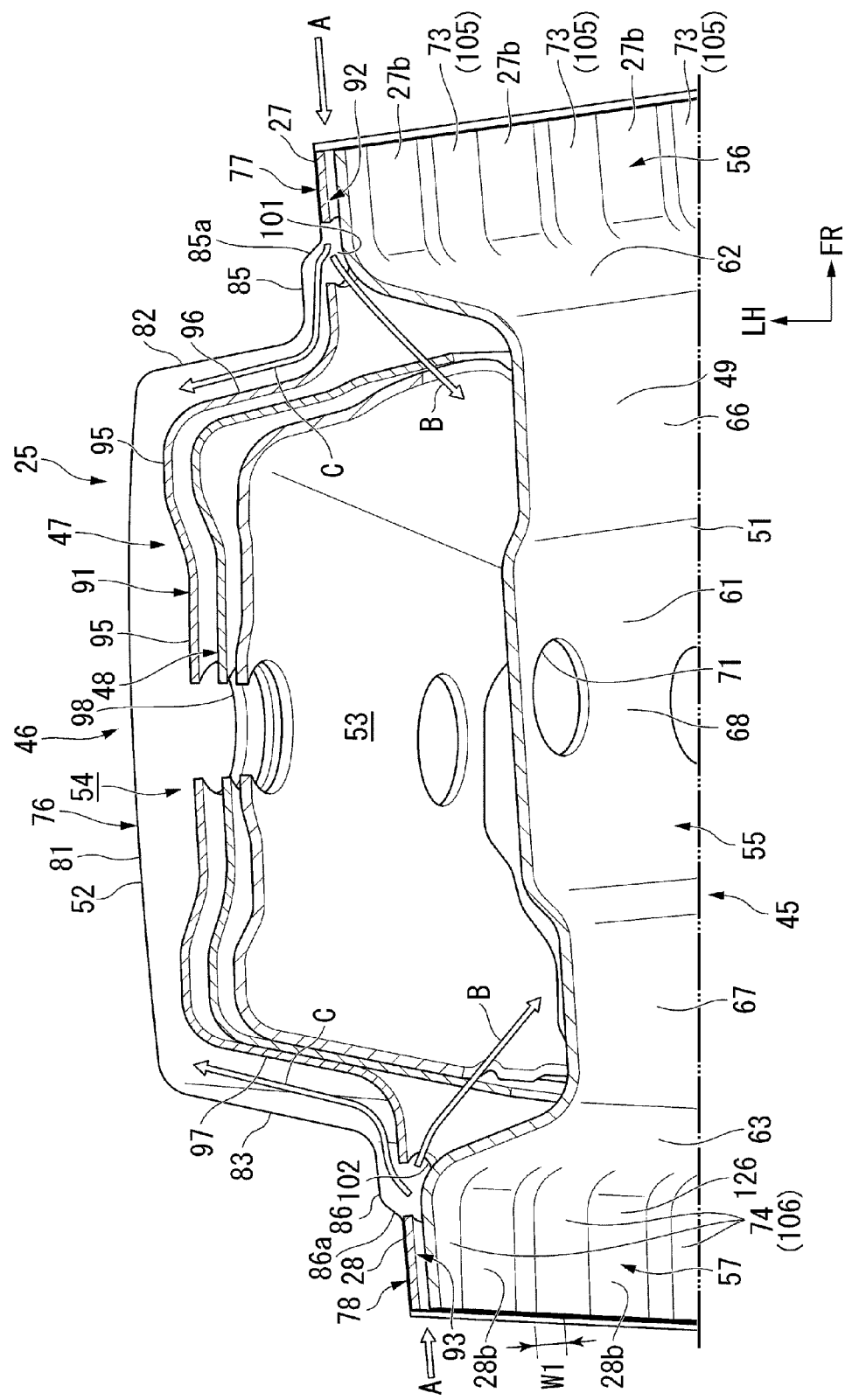

FIG. 7 is a cross-sectional view taken along the line VII-VII of FIG. 5.

Figure 8:
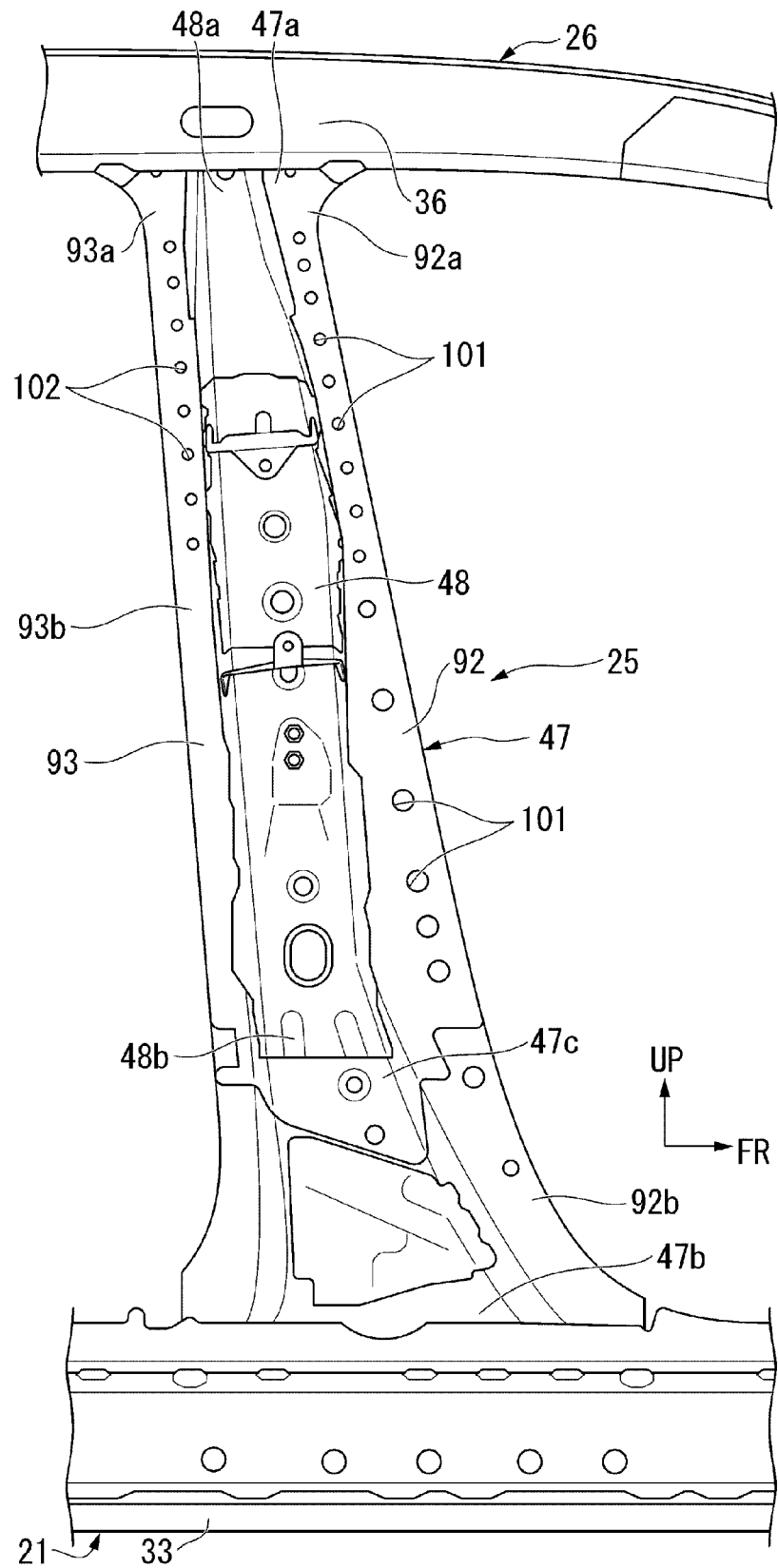

FIG. 8 is a side view of the vehicle body side structure of FIG. 5 with a center pillar inner panel removed.

Figure 9:
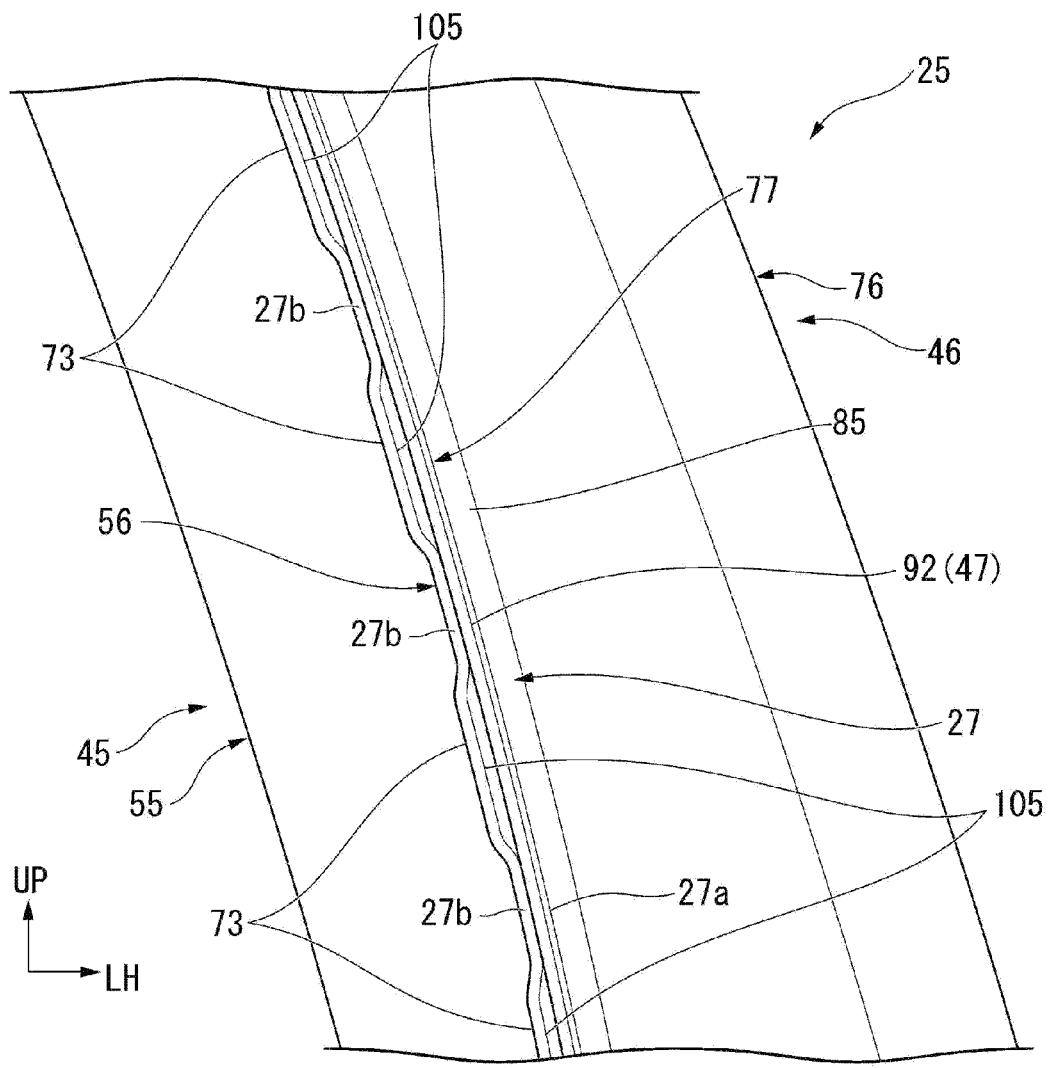

FIG. 9 is a front view as viewed from the direction of arrow IX of FIG. 2.

Figure 10:
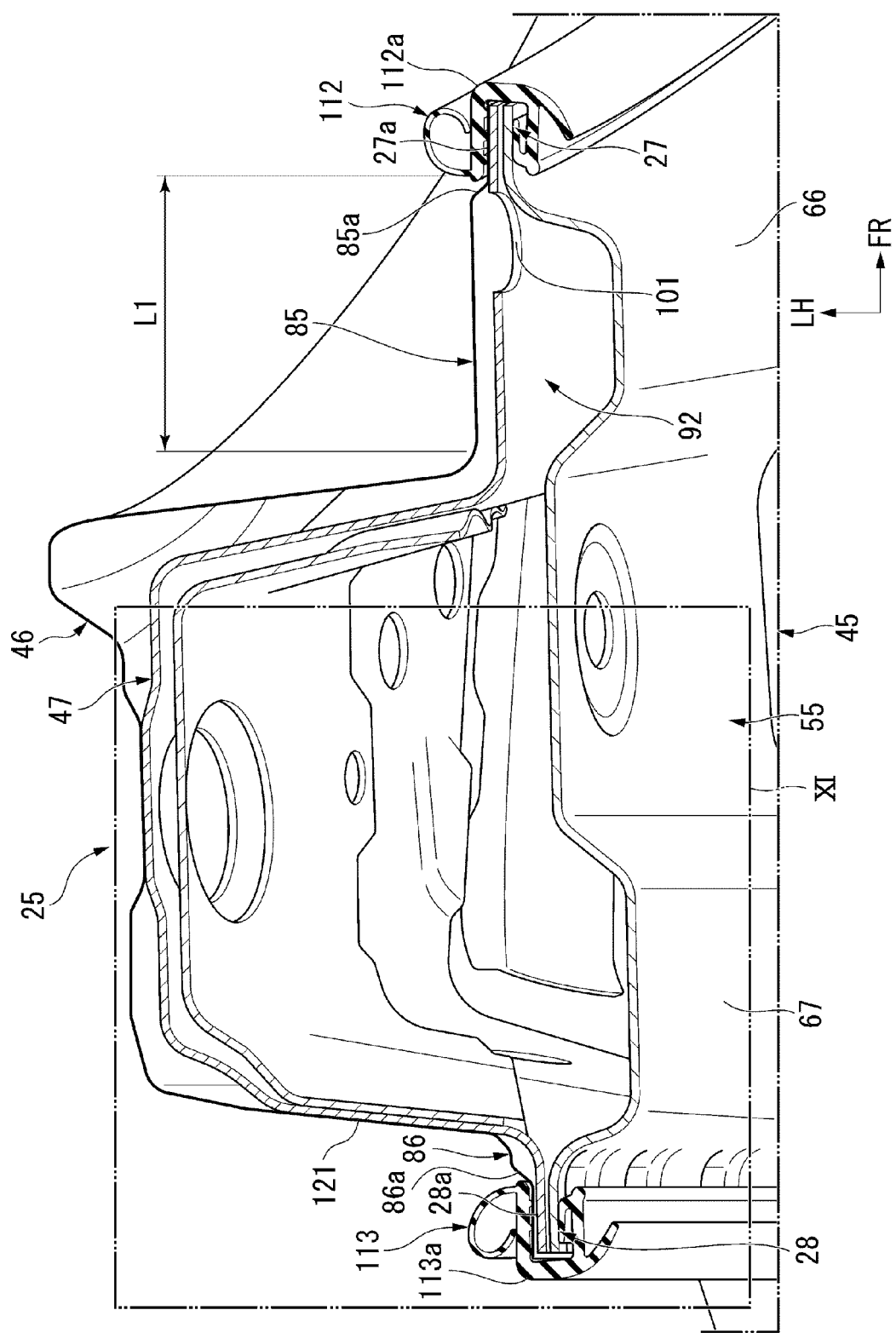

FIG. 10 is a cross-sectional view taken along the line XX of FIG. 5.

Figure 11:
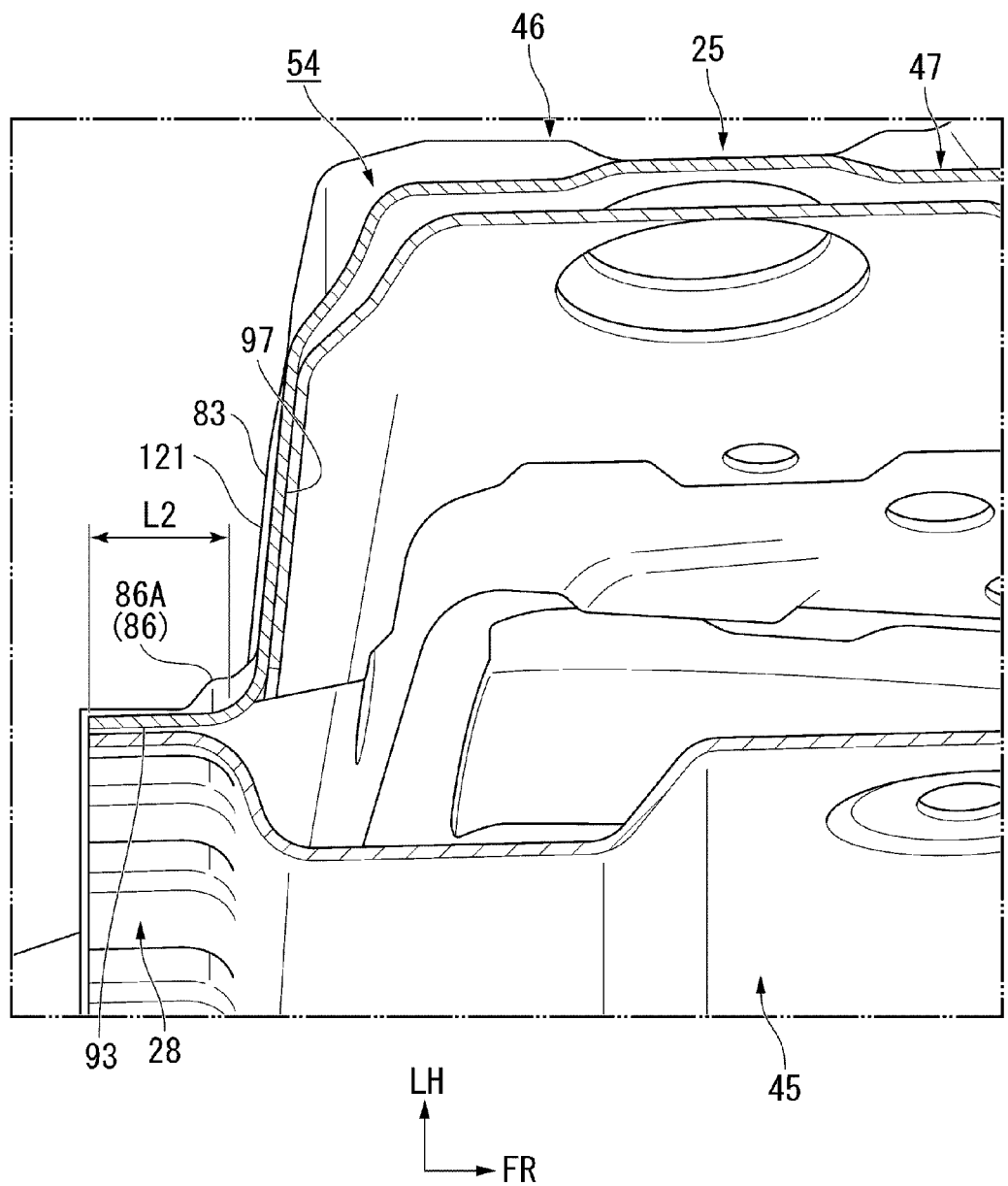

FIG. 11 is an enlarged cross-sectional view of FIG. 10 with a second door seal member removed.

Figure 12:
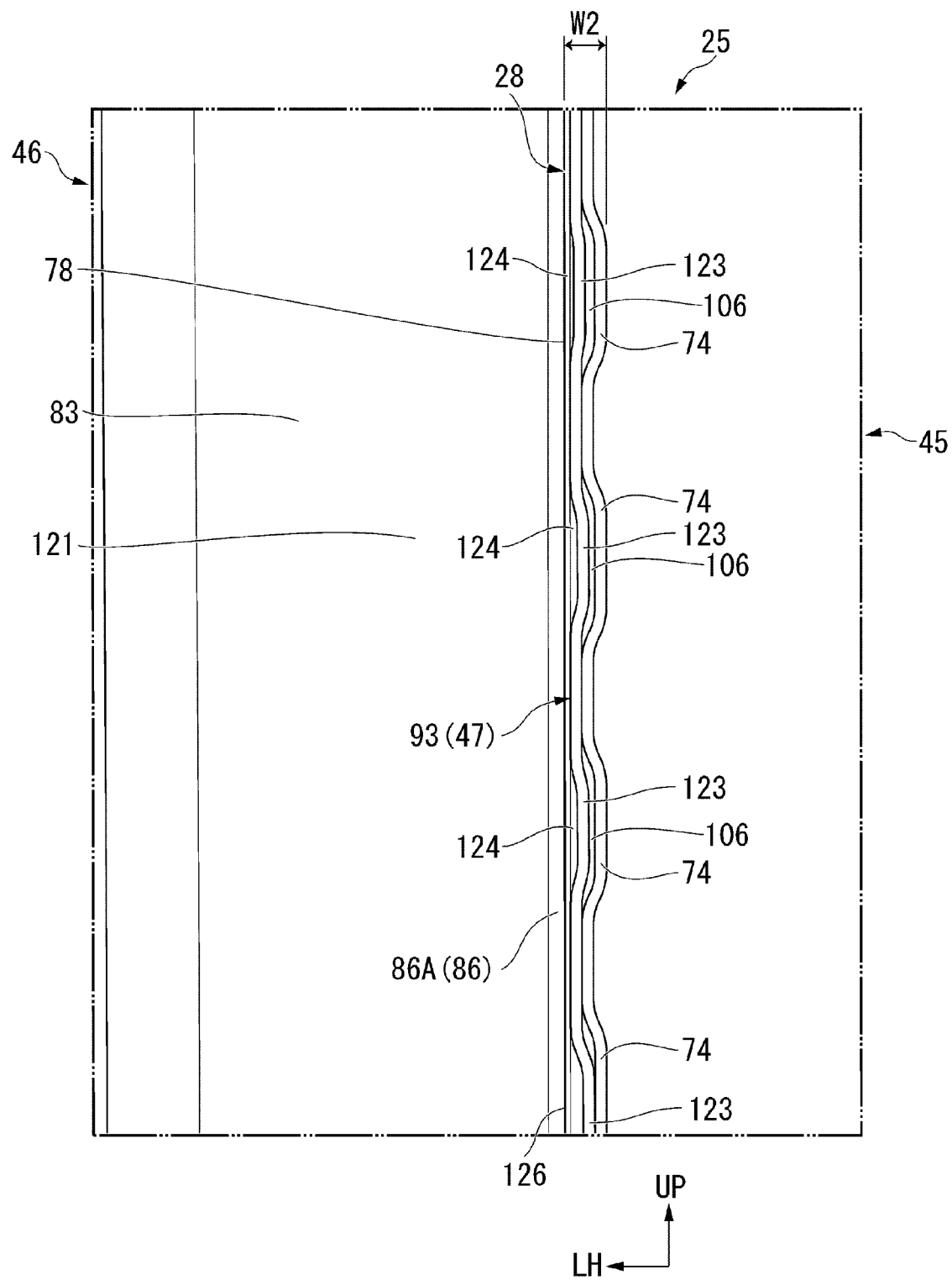

FIG. 12 is a rear view as viewed from the direction of arrow XII of FIG. 2.

Hereinafter, a vehicle body side structure according to an embodiment of the disclosure will be described with reference to the drawings. In the drawings, an arrow FR indicates the front of the vehicle, an arrow UP indicates the upper side of the vehicle, and an arrow LH indicates the left side of the vehicle. The vehicle is not particularly limited in terms of use and type, but an automatic vehicle will be described as an example of the embodiment.

<Vehicle>

As shown in FIG. 1, a vehicle Ve includes, for example, a vehicle body side structure 10 on the left and right sides in the vehicle width direction of the vehicle (the vehicle body side structure on the right side is not shown). Since the vehicle body side structure 10 is configured substantially symmetrically, the configuration of the left side will be described in detail below, and the description of the configuration on the right side will be omitted.

<Vehicle Body Side Structure>

The vehicle body side structure 10 is integrally bonded in which a vehicle body side structure main body 12 is covered from the outer side in the vehicle width direction by a side panel outer 13.

The side panel outer 13 is a panel that forms a design surface at the outer side in the vehicle width direction. The side panel outer 13 includes, for example, a side sill outer panel 32, a roof side outer panel (outer panel of a roof side rail 26) 37, a center pillar outer panel (the outer panel) 46, and the like, which will be described later.

The vehicle body side structure 10 is configured by joining the side panel outer 13 to the vehicle body side structure main body 12 from the outer side in the vehicle width direction. The vehicle body side structure 10 includes a side sill 21, a rear wheel housing 22, a quarter pillar 23, a front pillar 24, a center pillar 25, and the roof side rail 26.

The side sill 21 is formed in a closed cross section extending in the front-rear direction of the vehicle body on the side of the lower portion of the vehicle body. The rear wheel housing 22 is provided at a rear end portion 21a of the side sill 21. The quarter pillar 23 extends upward from an upper portion 22a of the rear wheel housing 22 and is inclined toward the front of the vehicle body.

The front pillar 24 extends upward from a front end portion 21b of the side sill 21. The center pillar 25 extends upward from a center portion 21c of the side sill 21 in the front-rear direction of the vehicle body. The roof side rail 26 is fixed to an upper end portion 24a of the front pillar 24, an upper end portion 25a of the center pillar 25, and an upper end portion 23a of the quarter pillar 23.

The roof side rail 26 is formed in a closed cross section (see FIG. 4) extending in the front-rear direction of the vehicle body on the side of the upper portion of the vehicle body.

<Side Sill>

As shown in FIGS. 1 to 3, the side sill 21 includes a side sill inner panel 31, the side sill outer panel 32, and a side sill stiffener (side sill reinforcing member) 33.

The side sill stiffener 33 is formed in a cross sectional hat shape having an upper flange 33a and a lower flange 33b. The side sill inner panel 31 is formed in a cross sectional hat shape having an upper flange 31a and a lower flange 31b.

The upper flanges 33a and 31a of the side sill stiffener 33 and the side sill inner panel 31 are bonded to each other. Further, the lower flanges 33b and 31b of the side sill stiffener 33 and the side sill inner panel 31 are bonded to each other. As a result, the side sill 21 is formed in a closed cross section by the side sill stiffener 33 and the side sill inner panel 31. The side sill outer panel 32 is bonded to the outer surface of the side sill stiffener 33 from the outer side in the vehicle width direction. The side sill 21 is a highly rigid member that forms a vehicle body frame on the side of the lower portion of the vehicle body.

<Roof Side Rail>

As shown in FIGS. 2 and 4, the roof side rail 26 includes a roof side inner panel 36, the roof side outer panel 37, and a roof side stiffener (roof side reinforcing member) 38. The roof side stiffener 38 includes an upper flange 38a and a lower flange 38b. The roof side inner panel 36 includes an upper flange 36a and a lower flange 36b.

The upper flanges 38a and 36a of the roof side stiffener 38 and the roof side inner panel 36 are bonded to each other. Further, the lower flanges 38b and 36b of the roof side stiffener 38 and the roof side inner panel 36 are bonded to each other. As a result, a first roof side closed cross section 39 is formed at the roof side rail 26 by the roof side stiffener 38 and the roof side inner panel 36. A roof side internal space 41 is formed by the first roof side closed cross section 39.

The roof side stiffener 38 is covered with the roof side outer panel 37 from the outer side in the vehicle width direction. An upper flange 37a of the roof side outer panel 37 is bonded to the upper flange 38a of the roof side stiffener 38. A second roof side closed cross section (roof side closed cross section) 43 is formed at the roof side rail 26 by the roof side stiffener 38 and a roof side outer panel 37. A roof side external space 44 is formed by the second roof side closed cross section.

The roof side rail 26 is a highly rigid member that forms the vehicle body frame on the side of the upper portion of the vehicle body.

<Center Pillar>

As shown in FIG. 1 and FIGS. 5-7, the center pillar 25 includes a center pillar inner panel (inner panel) 45 at the inner side in the vehicle width direction, the center pillar outer panel 46 at the outer side in the vehicle width direction, a center pillar stiffener (reinforcing member) 47, and a reinforcing plate 48.

In the center pillar 25, the center pillar stiffener 47 is sandwiched between the center pillar inner panel 45 and the center pillar outer panel 46.

The center pillar 25 is formed with a first closed cross section 51 at the inner side in the vehicle width direction by the center pillar inner panel 45 and the center pillar stiffener 47. Moreover, the center pillar 25 is formed with a second closed cross section 52 at the outer side in the vehicle width direction by the center pillar outer panel 46 and the center pillar stiffener 47.

The center pillar inner panel 45 bulges toward the inner side in the vehicle width direction with respect to the center pillar stiffener 47, and is erected from the side sill 21 to the roof side rail 26. The center pillar inner panel 45 includes an inner bulging portion 55, an inner front flange 56, and an inner rear flange 57.

The inner bulging portion 55 is formed in a U-shaped cross section in a manner of bulging toward the inner side in the vehicle width direction. The inner bulging portion 55 includes an inner top wall 61 disposed in the front-rear direction of the vehicle body, an inner front wall 62 bent toward the inner side in the vehicle width direction from the front side of the inner top wall 61, and an inner rear wall 63 bent toward the inner side in the vehicle width direction from the rear side of the inner top wall 61.

The inner top wall 61 includes an insertion opening portion 65 formed in a lower portion 61a, a pair of beads 66 and 67 formed along the front and rear sides, and multiple inner panel through holes 71 formed in a groove portion 68 between the pair of beads 66 and 67. The insertion opening portion 65 is an opening for inserting the seatbelt retracting device (not shown) inside the center pillar 25. Further, the webbing of the seatbelt retracting device is pulled out from the insertion opening portion 65 into the passenger compartment.

The pair of beads 66 and 67 are disposed on both sides of the groove portion 68 at interval in the front-rear direction of the vehicle body. The pair of beads 66 and 67 bulge toward the inner side in the vehicle width direction with respect to the groove portion 68, and extend continuously in the vertical direction from the upper end portion (i.e. the roof side rail 26) to the lower end portion (i.e. the side sill 21) of the center pillar inner panel 45. The multiple inner panel through holes 71 are formed at intervals in the vertical direction from the upper end portion (such as the roof side rail 26) of the center pillar inner panel 45 to the insertion opening portion 65 of the seatbelt retracting device.

The inner front flange 56 projects from the front opening side of the inner bulging portion 55 (i.e. the inner front wall 62) toward the front of the vehicle body. The inner front flange 56 includes multiple front flange bulging portions (the bulging portions) 73. The multiple front flange bulging portions 73 are provided at intervals in the vertical direction from an upper end portion 56a of the inner front flange 56 to the insertion opening portion 65. The front flange bulging portions 73 are formed in a manner of bulging toward the inner side in the vehicle width direction and extend in the front-rear direction of the vehicle body.

The inner rear flange 57 projects from the rear opening side of the inner bulging portion 55 (i.e. the inner front wall 62) toward the rear of the vehicle body. The inner rear flange 57 includes multiple rear flange bulging portions (the bulging portions) 74. The multiple rear flange bulging portions 74 are provided at intervals in the vertical direction from an upper end portion 57a of the inner rear flange 57 to the insertion opening portion 65. The rear flange bulging portions 74 are formed in a manner of bulging toward the inner side in the vehicle width direction and extend in the front-rear direction of the vehicle body.

The center pillar inner panel 45 is formed in a cross sectional hat shape by the inner bulging portion 55, the inner front flange 56, and the inner rear flange 57.

The center pillar outer panel 46 is erected from the side sill 21 to the roof side rail 26 on the outside of the vehicle width direction. The center pillar outer panel 46 includes an outer bulging portion 76, an outer front flange 77, and an outer rear flange 78.

The outer bulging portion 76 is formed in a U-shaped cross section in a manner of bulging toward the outer side in the vehicle width direction. The outer bulging portion 76 includes an outer top wall 81 disposed in the front-rear direction of the vehicle body, an outer front wall 82 bent toward the inner side in the vehicle width direction from the front side of the outer top wall 81, and an outer rear wall 83 bent toward the inner side in the vehicle width direction from the rear side of the outer top wall 81.

The outer front flange 77 projects from the front opening side of the outer front wall 82 toward the front of the vehicle body. The outer front flange 77 includes a front step passage (step passage) 85 continuously formed on the front opening side of the outer front wall 82.

The front step passage 85 is formed in a stepped shape at interval toward the outer side in the vehicle width direction with respect to a stiffener front flange 92 (described later) of the center pillar stiffener 47. The front step passage 85 includes a front step portion (step portion) 85a in which the rear portion of the outer front flange 77 is bent toward the outer side in the vehicle width direction.

The outer rear flange 78 projects from the rear opening side of the outer rear wall 83 toward the rear of the vehicle body. The outer rear flange 78 includes a rear step passage (step passage) 86 continuously formed at a rear opening side of the outer rear wall 83. The rear step passage 86 is formed in a stepped shape at interval toward the outer side in the vehicle width direction with respect to a stiffener rear flange 93 (described later) of the center pillar stiffener 47. The rear step passage 86 includes a rear step portion (step portion) 86a in which the front portion of the outer rear flange 78 is bent toward the outer side in the vehicle width direction.

The center pillar outer panel 46 is formed in a cross sectional hat shape by the outer bulging portion 76, the outer front flange 77, and the outer rear flange 78.

The center pillar stiffener 47 is sandwiched between the center pillar inner panel 45 and the center pillar outer panel 46, and is erected from the side sill 21 to the roof side rail 26. The center pillar stiffener 47 includes a stiffener bulging portion 91, the stiffener front flange (front reinforcing flange) 92, and the stiffener rear flange (rear reinforcing flange) 93.

The stiffener bulging portion 91 is formed in a U-shaped cross section in a manner of bulging toward the outer side in the vehicle width direction along the outer bulging portion 76. The stiffener bulging portion 91 includes a stiffener top wall (top) 95 disposed in the front-rear direction of the vehicle body, a stiffener front wall 96 bent toward the inner side in the vehicle width direction from the front side of the stiffener top wall 95, and a stiffener rear wall 97 bent toward the inner side in the vehicle width direction from the rear side of the stiffener top wall 95. The stiffener top wall 95 has multiple top through holes (other through holes) 98. The multiple top through holes 98 are formed (drilled) at intervals in the vertical direction.

As shown in FIGS. 6 to 8, the center pillar stiffener 47 includes the reinforcing plate (the another reinforcing member) 48 at a portion of the stiffener bulging portion 91 where stress is most concentrated due to a side collision. Hereinafter, the portion of the stiffener bulging portion 91 where the stress is most concentrated due to a side collision may be referred to as a "stress concentration portion". For example, in the embodiment, a range from an upper end portion 47a to a portion 47c near the lower end of the center pillar stiffener 47 is illustrated, but the stress concentration portion is not limited to this range.

The reinforcing plate 48 is formed in a U-shaped cross section along the inner surface of the stiffener bulging portion 91, and is a member having relatively high strength and rigidity. The reinforcing plate 48 extends in the vertical direction from the upper end portion 47a of the center pillar stiffener 47 to the portion 47c near the lower end along the stiffener bulging portion 91 of the center pillar stiffener 47. The portion 47c near the lower end is a portion located, to some extent, above a lower end portion 47b of the center pillar stiffener 47.

By providing the reinforcing plate 48 at the stress concentration portion of the center pillar stiffener 47, the stress concentration portion is reinforced by the reinforcing plate 48.

As shown in FIGS. 6 to 8, the stiffener front flange 92 projects from the front opening side of the stiffener front wall 96 toward the front of the vehicle body. The stiffener front flange 92 has multiple front through holes (through holes) 101. The multiple front through holes 101, for example, are formed (drilled) in a circular shape at intervals in the vertical direction from an upper end portion 92a to a lower end portion 92b of the stiffener front flange 92, for example.

The multiple front through holes 101 are formed such that the diameters gradually increase in size toward the lower portion of the center pillar 25 (i.e. the lower end portion 92b of the stiffener front flange 92).

The stiffener rear flange 93 projects from the inner opening edge of the stiffener rear wall 97 toward the rear of the vehicle body. The stiffener rear flange 93 has multiple rear through holes (through holes) 102. The multiple rear through holes 102 are formed (drilled) in a circular shape at intervals in the vertical direction from, for example, an upper end portion 93a of the stiffener rear flange 93 to a portion 93b in the middle of the stiffener rear flange 93. In the embodiment, the front through holes 101 and the rear through holes 102 are described as, for example, circular shapes, but the shapes of the front through holes 101 and the rear through holes 102 are not limited to circle.

The center pillar stiffener 47 is formed in a cross sectional hat shape (hat-like cross section) by the stiffener bulging portion 91, the stiffener front flange 92, and the stiffener rear flange 93.

As described above, according to the center pillar 25 of the vehicle body side structure 10 as shown in FIGS. 5, 7, and 9, the stiffener front flange 92 is bonded by the inner front flange 56 and the outer front flange 77 in a state of being sandwiched in the vehicle width direction. Thus, a front flange 27 of the center pillar 25 is formed by the inner front flange 56, the stiffener front flange 92, and the outer front flange 77.

Furthermore, the stiffener rear flange 93 is bonded by the inner rear flange 57 and the outer rear flange 78 in a state of being sandwiched in the vehicle width direction. Thus, a rear flange 28 of the center pillar 25 is formed by the inner rear flange 57, the stiffener rear flange 93, and the outer rear flange 78.

Further, a first internal space (internal space) 53 of the first closed cross section 51 is formed by the center pillar inner panel 45 and the center pillar stiffener 47. A second internal space (internal space) 54 of the second closed cross section 52 is formed by the center pillar outer panel 46 and the center pillar stiffener 47.

The multiple front through holes 101 are communicated with each other in the first internal space 53 of the first closed cross section 51. The multiple front through holes 101 are communicated with the second internal space 54 of the second closed cross section 52 through the internal space of the front step passage 85.

Further, the stiffener front flange 92 of the center pillar stiffener 47 is overlapped with the front flange bulging portions 73 of the center pillar inner panel 45 from the outer side in the vehicle width direction. As a result, multiple front gap passages (gap passages) 105 are formed by the stiffener front flange 92 and the multiple front flange bulging portions 73.

The multiple front gap passages 105 are opened in a manner of communicating the inside and the outside of the center pillar 25. Specifically, the multiple front gap passages 105 are opened in a manner of communicating the first internal space 53 of the first closed cross section 51 with the outside of the center pillar 25, and to communicate the multiple front through holes 101 with the outside of the center pillar 25.

In other words, the first internal space 53 of the first closed cross section 51 is communicated with the outside of the center pillar 25 through the multiple front gap passages 105. Further, the second internal space 54 of the second closed cross section 52 is communicated with the outside of the center pillar 25 through the internal space of the front step passage 85 as well as the multiple front through holes 101 and the multiple front gap passages 105.

Further, the multiple rear through holes 102 are communicated with each other in the first internal space 53 of the first closed cross section 51. The multiple rear through holes 102 are communicated with the second internal space 54 of the second closed cross section 52 through the internal space of the rear step passage 86.

Further, the stiffener rear flange 93 of the center pillar stiffener 47 is overlapped with the rear flange bulging portions 74 of the center pillar inner panel 45 from the outer side in the vehicle width direction. As a result, multiple rear gap passages (gap passages) 106 are formed by the stiffener rear flange 93 and the multiple rear flange bulging portions 74.

The multiple rear gap passages 106 are opened in a manner of communicating the inside and the outside of the center pillar 25. Specifically, the multiple rear gap passages 106 are open in a manner of communicating the first internal space 53 of the first closed cross section 51 with the outside of the center pillar 25, and to communicate the multiple rear through holes 102 with the outside of the center pillar 25.

That is, the first internal space 53 of the first closed cross section 51 is communicated with the outside of the center pillar 25 through the multiple rear gap passages 106. Further, the second internal space 54 of the second closed cross section 52 is communicated with the outside of the center pillar 25 through the internal space of the rear step passage 86 as well as the multiple rear through holes 102 and the multiple rear gap passages 106.

Thus, for example, by immersing the vehicle body side structure 10 (i.e. the center pillar 25) in the electrodeposition liquid, the electrodeposition liquid flows from the outside of the center pillar 25 into the multiple front gap passages 105 and the multiple rear gap passages 106 as shown by arrows A. A part of the electrodeposition liquid flowing into the multiple front gap passages 105 and the multiple rear gap passages 106 can flow the electrodeposition liquid into the first internal space 53 of the first closed cross section 51 through the multiple front gap passages 105 and the multiple rear gap passages 106 as shown by arrows B.

Further, the remaining electrodeposition liquid flowing into the multiple front gap passages 105 can flow into the second internal space 54 of the second closed cross section 52 as shown by arrows C through the internal spaces of the multiple front gap passages 105, the multiple front through holes 101, and the front step passage 85. Further, the remaining electrodeposition liquid flowing into the multiple rear gap passages 106 can flow into the second internal space 54 of the second closed cross section 52 as shown by the arrow C through the internal spaces of the multiple rear gap passages 106, the multiple rear through holes 102, and the rear step passage 86.

Therefore, the electrodeposition liquid can be satisfactorily filled in the center pillar 25, and the electrodeposition coating can be well applied to every corner of the center pillar 25.

Further, as shown in FIGS. 7, 9, and 10, it is only necessary to form the multiple front flange bulging portions 73 and the multiple rear flange bulging portions 74 on the center pillar inner panel 45, and there is no need to dispose the front flange bulging portions and the rear flange bulging portions on the center pillar outer panel 46. Accordingly, the center pillar outer panel 46 can form a flat door seal mounting surface at the outer side in the vehicle width direction by the outer front flange 77 and the outer rear flange 78. In other words, in the front flange 27 and the rear flange 28 of the center pillar 25, door seal mounting surfaces 27a and 28a at the outer side in the vehicle width direction can be formed flat. Hereinafter, the door seal mounting surfaces 27a and 28a at the outer side in the vehicle width direction may be referred to as "the door seal mounting outer surfaces 27a and 28a".

Accordingly, by providing a first door seal member (a door seal member) 112 on the front flange 27 of the center pillar 25, the sealability of the first door seal member 112 with respect to the door seal mounting outer surface 27a of the front flange 27 can be secured. Further, by providing a second door seal member (a door seal member) 113 on the rear flange 28 of the center pillar 25, the sealability of the second door seal member 113 with respect to the door seal mounting outer surface 28a of the rear flange 28 can be secured.

Further, the front gap passages 105, the front through holes 101, and the front step passage 85 are formed on the front flange 27 of the center pillar 25. Moreover, the rear gap passages 106, the rear through holes 102, and the rear step passage 86 are formed on the rear flange 28 of the center pillar 25. Thus, the front gap passages 105, the front through holes 101, the front step passage 85, the rear gap passages 106, the rear through holes 102, and the rear step passage 86 are formed at both flanges of the center pillar 26: the front flange 27 and the rear flange 28.

Therefore, even if the front gap passages 105, the front through holes 101, the front step passage 85, the rear gap passages 106, the rear through holes 102, and the rear step passage 86 are formed small, the electrodeposition liquid can be satisfactorily filled inside the center pillar 25. As a result, for example, while ensuring the strength and rigidity against the side collision load input to the center pillar 25, the electrodeposition coating can be satisfactorily applied to every corner inside the center pillar 25.

Further, as shown in FIGS. 5 and 6, the multiple front gap passages 105 are formed at predetermined intervals in the vertical range from the upper end portion 56a (i.e. the roof side rail 26) of the inner front flange 56 to the insertion opening portion 65 of the seatbelt retracting device. The multiple rear gap passages 106 are formed at predetermined intervals in the vertical range from the upper end portion 57a (i.e. the roof side rail 26) of the inner rear flange 57 to the insertion opening portion 65.

The reason why the front gap passages 105 and the rear gap passages 106 are formed avoiding the insertion opening portion 65 is as follows.

That is, in the center pillar inner panel 45, the insertion opening portion 65 for inserting the seatbelt retracting device is opened at the lower portion 61a of the inner top wall 61. The insertion opening portion 65 is open in a relatively large shape for inserting the seatbelt retracting device. Therefore, the electrodeposition liquid can be sufficiently flowed into the center pillar 25 from the insertion opening portion 65 as shown by an arrow D. Therefore, there is no need to form the front gap passages 105 and the rear gap passages 106 at the lower portion of the center pillar 25.

Further, by eliminating the need for the front gap passages 105 and the rear gap passages 106, the front through holes 101 and the rear through holes 102 can be reduced or eliminated from the center pillar stiffener 47 at the portion corresponding to the insertion opening portion 65. Even in this case, the electrodeposition liquid can be sufficiently flowed from the insertion opening portion 65 to every corner of the center pillar 25.

In addition, the top through holes 98 formed in the stiffener top wall 95 of the center pillar stiffener 47 can be reduced or eliminated from, for example, the portion corresponding to the insertion opening portion 65. As a result, the strength and rigidity of the vehicle body side (particularly the center pillar 25) can be improved, and the so-called side collision performance against a side collision can be improved.

Further, the center pillar 25 is formed with a large closed cross section toward the lower portion (i.e. the side sill 21). Therefore, the multiple front through holes 101 are formed in a manner of gradually increasing in size toward the lower portion of the center pillar 25 (i.e. the lower end portion 92*b* of the stiffener front flange 92). Thus, the inflow amount of the electrodeposition liquid into the interior of the center pillar 25 can be secured.

As shown in FIGS. 2, 6, and 10, the front step passage 85 is formed such that a distance L1 in the front-rear direction of the vehicle body gradually increases in size toward the lower portion (the side sill 21) of the center pillar 25 in accordance with the shapes (diameters in the embodiment) of the multiple front through holes 101. As a result, the inflow amount of the electrodeposition liquid into the center pillar 25 can be secured.

As shown in FIGS. 7 and 9, the front flange 27 of the center pillar 25 is bonded by overlapping the inner front flange 56, the stiffener front flange 92, and the outer front flange 77 at portions 27*b* between the front gap passages 105 adjacent in the vertical direction. Further, the rear flange 28 of the center pillar 25 is bonded by overlapping the inner rear flange 57, the stiffener rear flange 93, and the outer rear flange 78 at portions 28*b* between the rear gap passages 106 adjacent in the vertical direction.

As a result, the joining strength of the center pillar 25 can be secured, and for example, the strength and rigidity against the side collision load input to the center pillar 25 can be secured.

Moreover, the front step passage 85 extends in a longitudinal direction of the center pillar 25, but does not interfere with such a joining because it begins from the front through holes 101 rather than the free end of the front flange 27. Similarly, the rear step passage 86 extends in the longitudinal direction of the center pillar 25, but does not interfere with the joining because the extension begins from the rear through holes 102 rather than the free end of the rear flange 28.

As shown in FIG. 10, a fixing portion 112*a* of the first door seal member 112 is attached to the front flange 27 of the center pillar 25. By abutting the fixing portion 112*a* against the front step portion 85*a* of the front step passage 85, the fixing portion 112*a* of the first door seal member 112 can be reliably fixed to the front flange 27. Thereby, sealability between the front flange 27 of the center pillar 25 and the first door seal member 112 can be improved.

The first door seal member 112 abuts on the front side door in a state where the front side door (not shown) is closed so as to ensure the sealability between the front side door and the center pillar 25 (particularly the front flange 27).

A fixing portion 113*a* of the second door seal member 113 is attached to the rear flange 28 of the center pillar 25. By abutting the fixing portion 113*a* against the rear step portion 86*a* of the rear step passage 86, the second door seal member 113 can be reliably fixed to the rear flange 28. Thereby, the sealability (sealing property) between the rear flange 28 of the center pillar 25 and the second door seal member 113 can be improved.

The second door seal member 113 abuts on the rear side door in a state where the rear side door (not shown) is closed so as to ensure the sealability between the rear side door and the center pillar 25 (particularly the rear flange 28).

As shown in FIGS. 2, 6, 11, 12, the center pillar 25 includes a door hinge fixing portion 121 on the outer rear wall 83 of the center pillar outer panel 46 and the stiffener rear wall 97 of the center pillar stiffener 47. For example, the door hinges (both not shown) of the rear side door are attached to the door hinge fixing portion 121 with fastening members such as bolts or nuts.

Here, in the door hinge fixing portion 121, for example, a flange width L2 of the stiffener rear flange 93 is formed short so as to attach the door hinges, and the stiffener rear wall 97 is in contact with or close to the outer rear wall 83. Therefore, it is difficult to ensure the fluidity of the electrodeposition liquid between the rear step passage 86 corresponding to the door hinge fixing portion 121 and the second internal space 54. Hereinafter, the rear step passage 86 corresponding to the door hinge fixing portion 121 may be referred to as "a door hinge rear step passage 86A."

Thus, since the flange width L2 is small (short), the rear step passage 86 cannot be formed sufficient. Therefore, multiple stiffener flange bulging portions (other bulging portions) 123 are formed at the stiffener rear flange 93 of the center pillar stiffener 47. Specifically, the multiple stiffener flange bulging portions 123 are formed in a manner of bulging toward the rear gap passages 106 with respect to the outer rear flange 78 at a portion of the stiffener rear flange 93 corresponding to the door hinge fixing portion 121.

Thus, by overlapping the outer rear flange 78 with the multiple stiffener flange bulging portions 123, multiple stiffener gap passages (other gap passages) 124 are formed. The multiple stiffener gap passages 124 are formed in a manner of communicating with the door hinge rear step passage 86A and the outside of the center pillar 25. In this way, the fluidity of the electrodeposition liquid can be secured by communicating the door hinge rear step passage 86A to the outside of the center pillar 25 through the multiple stiffener gap passages 124.

Hereinafter, in the rear flange 28 of the center pillar 25, the portion where only the multiple rear gap passages 106 are formed will be described as a first portion 126, and the portion where both passages of the multiple rear gap passages 106 and the multiple stiffener gap passages 124 are formed will be described as a second portion 127.

Further, as shown in FIGS. 6, 7, 10, and 12, the rear flange 28 of the center pillar 25 is formed in the first portion 126 in which a width W1 in the vehicle width direction has the same width with a width W2 in the vehicle width direction of the second portion 127. The width W1 in the vehicle width direction and the width W2 in the vehicle width direction are the widths in the vehicle width direction between the outer rear flange 78 and the rear flange bulging portions 74.

By forming the width W1 of the first portion 126 and the width W2 of the second portion 127 with the same width, for example, mountability can be well ensured when the second door seal member 113 is attached to the rear flange 28 of the center pillar 25. Further, in a state where the second door seal member 113 is attached to the rear flange 28, for example, the sealability between the second door seal member 113 and the rear flange 28 can be satisfactorily ensured.

Also, as shown in FIG. 6 and FIG. 8, the upper end portion 47*a* of the center pillar stiffener 47 is fixed by joining to an outer surface 38*c* of the roof side stiffener 38 at the outer side in the vehicle width direction. Further, the lower end portion 47*b* of the center pillar stiffener 47 is fixed by joining to an outer surface 33*c* of the side sill stiffener 33 at the outer side in the vehicle width direction. Thus, the strength and rigidity of the vehicle body side (particularly the center pillar 25) can be improved, and the so-called side collision performance against a side collision can be improved.

Moreover, the multiple front through holes 101 are formed at the stiffener front flange 92 of the center pillar stiffener 47 in the vertical direction. Further, the multiple rear through holes 102 are formed at the stiffener rear flange 93 of the center pillar stiffener 47 in the vertical direction. As a result, the electrodeposition liquid can be smoothly flowed into every corner of the center pillar 25.

Further, as shown in FIGS. 6 to 8, the center pillar stiffener 47 is formed into a hat-like cross section, and the center pillar inner panel 45 is formed in a cross sectional hat shape. Further, the stiffener front flange 92 and the inner front flange 56 are overlapped and bonded. Additionally, the stiffener rear flange 93 and the inner rear flange 57 are overlapped and bonded.

Therefore, a closed cross section column with high strength and rigidity is formed by the center pillar stiffener 47 and the center pillar inner panel 45. Moreover, the center pillar outer panel 46 is overlapped along the outer surface of the center pillar stiffener 47. Thus, the strength and rigidity of the vehicle body side (particularly the center pillar 25) can be improved, and the so-called side collision performance against a side collision can be improved.

Further, the multiple top through holes 98 are formed at the stiffener top wall 95 of the center pillar stiffener 47 at intervals in the vertical direction. Here, the center pillar stiffener 47 is formed into a hat-like cross section. Therefore, the stiffener top wall 95 can be secured to be relatively large. As a result, the top through holes 98 of the stiffener top wall 95 can be formed relatively large.

Therefore, for example, even in the case of the second internal space 54 in which the second closed cross section 52 formed by the center pillar stiffener 47 and the center pillar outer panel 46 is narrow, a sufficient amount of electrodeposition liquid can be flowed into the inside of the second closed cross section 52.

Further, the center pillar stiffener 47 includes the reinforcing plate 48, for example, at a portion of the stiffener bulging portion 91 where stress is most concentrated due to a side collision. By providing the reinforcing plate 48 at the portion of the stiffener bulging portion 91, the portion where the stress is most concentrated due to the side collision can be reinforced by the reinforcing plate 48.

Thus, even if the top through holes 98 are formed relatively large at the stiffener top wall 95 of the stiffener, the strength and rigidity of the center pillar stiffener 47 (such as the center pillar 25) can be secured, and the so-called collision performance deterioration due to a side collision can be compensated by the reinforcing plate 48.

In addition, as shown in FIG. 4 and FIG. 5, the second roof side closed cross section 43 is formed by the roof side stiffener 38 and the roof side outer panel 37. The upper end portion 47a of the center pillar stiffener 47 is fixed to the outer surface 38c of the roof side stiffener 38, which is at the outer side in the vehicle width direction.

Therefore, the upper end portion 47a of the center pillar stiffener 47 is disposed inside the second roof side closed cross section 43 (i.e. the roof side external space 44). Also, an upper end portion 46a of the center pillar outer panel 46 is integrally and continuously formed at a lower side 37b of the roof side outer panel 37. As a result, the second closed cross section 52 of the center pillar 25 is communicated with the second roof side closed cross section 43.

Further, the center pillar inner panel 45 includes a discharge port portion 45a formed at the upper end portion. The discharge port portion 45a bulges toward the inner side in the vehicle width direction and is opened toward the inner side in the vehicle width direction, for example, upward.

Here, for example, the electrodeposition liquid flows into the inside of the first closed cross section 51 as shown by the arrow D from the insertion opening portion 65 of the seatbelt retracting device formed at the lower portion of the center pillar 25. The electrodeposition liquid flowing into the inside of the first closed cross section 51 fills the inside of the first closed cross section 51 of the upper portion from the insertion opening portion 65. A part of the electrodeposition liquid filled inside the first closed cross section 51 is discharged outside of the inner side in the vehicle width direction from the discharge port portion 45a of the center pillar inner panel 45.

Further, the remaining electrodeposition liquid filled inside the first closed cross section 51 flows into the inside of the second closed cross section 52 through the multiple top through holes 98 of the center pillar stiffener 47 (specifically, the stiffener top wall 95). The electrodeposition liquid filled in the inside of the second closed cross section 52 is discharged from the inside of the second closed cross section 52 to the inside of the second roof side closed cross section 43.

Further, in the inner top wall 61 of the center pillar inner panel 45, the pair of beads 66 and 67 extend continuously in the vertical direction from the upper end portion (i.e. the discharge port portion 45a) of the center pillar inner panel 45 to a lower end portion 45b. Therefore, the strength and rigidity of the center pillar inner panel 45 can be increased by the pair of beads 66 and 67. As a result, the strength and rigidity of the center pillar 25 (i.e. the side portion of the vehicle body side) can be improved, and the so-called side collision performance against a side collision can be improved.

In addition, at the center pillar inner panel 45, the multiple inner panel through holes 71 are opened in the groove portion 68 between the pair of beads 66 and 67. The multiple inner panel through holes 71 are formed at intervals in the vertical direction from the upper end portion (the discharge port portion 45a) of the center pillar inner panel 45 to the insertion opening portion 65 of the seatbelt retracting device.

Thus, the multiple inner panel through holes 71 can serve for both the inflow of the electrodeposition liquid to the center pillar 25 and the discharge of the electrodeposition liquid from the inside of the center pillar 25.

It should be noted that the technical scope of the disclosure is not limited to the above embodiments, the spirit of the disclosure, such deviating can be modified in various ways have range.

In addition, it is possible to replace the components in the embodiments with well-known components as appropriate without departing from the spirit of the disclosure, and the above-mentioned modifications may be appropriately combined.

What is claimed is:

1. A vehicle body side structure, the vehicle body side structure comprising:
 a center pillar, wherein a reinforcing member is sandwiched between an inner panel at an inner side in a vehicle width direction and an outer panel at an outer side in the vehicle width direction, a first closed cross section is formed at the inner side in the vehicle width direction by the inner panel and the reinforcing member, and a second closed cross section is formed at the outer side in the vehicle width direction by the outer panel and the reinforcing member; wherein the inner panel bulges toward the inner side in the vehicle width direction with respect to the reinforcing member and comprises bulging portions where the reinforcing member is overlapped;

the reinforcing member has through holes communicating with an internal space of the first closed cross section;

the outer panel bulges toward the outer side in the vehicle width direction with respect to the reinforcing member and comprises step passages through which the through holes are communicated with an internal space of the second closed cross section; and gap passages are provided communicating the first closed cross section to the outside by overlapping the reinforcing member with the bulging portions of the inner panel.

2. The vehicle body side structure according to claim 1, wherein
the gap passages, the through holes, and the step passages are formed at a front flange of the center pillar at the front of the vehicle body and a rear flange of the center pillar at the rear of the vehicle body.

3. The vehicle body side structure according to claim 1, wherein
the gap passages are formed in plurality at predetermined intervals in a vertical range from an insertion opening portion of a seatbelt retracting device formed at a lower portion of the center pillar to a roof side rail.

4. The vehicle body side structure according to claim 1, wherein
the though holes are formed in plurality in a manner of gradually increasing in size toward the lower portion of the center pillar.

5. The vehicle body side structure according to claim 4, wherein
the step passages are formed in a manner of gradually increasing in size in a front-rear direction of the vehicle body toward the lower portion of the center pillar in accordance with the through holes.

6. The vehicle body side structure according to claim 1, wherein
the gap passages are formed in plurality in the vertical direction, and the inner panel, the reinforcing member, and the outer panel, are bonded between the adjacent gap passages.

7. The vehicle body side structure according to claim 1, wherein
fixing portions of door seal members are provided at the center pillar; and
the step passages comprise step portions with which the fixing portions abut.

8. The vehicle body side structure according to claim 1, wherein
the center pillar comprises a door hinge fixing portion to which door hinges are attached, and
wherein the reinforcing member comprises other bulging portions that bulge toward the gap passages with respect to the outer panel at a portion corresponding to the door hinge fixing portion, and other gap passages are provided communicating with the step passages and outside by overlapping the outer panel with the other bulging portions.

9. The vehicle body side structure according to claim 8, wherein
the center pillar comprises a door seal member at a first portion where the gap passages are formed and a second portion where the other gap passages and the gap passages are formed; and
a width of the second portion in the vehicle width direction is the same as a width of the first portion in the vehicle width direction.

10. The vehicle body side structure according to claim 1, wherein
the reinforcing member is fixed to a roof side reinforcing member of a roof side rail and a side sill reinforcing member of a side sill, and comprises a front reinforcing flange and a rear reinforcing flange formed in the front-rear direction of the vehicle body, wherein
the plurality of through holes are formed in the vertical direction in the front reinforcing flange and the rear reinforcing flange.

11. The vehicle body side structure according to claim 1, wherein
the reinforcing member is formed into a hat-like cross section;
the center pillar comprises a column of the first closed cross section formed by the reinforcing member and the inner panel; and
the outer panel is overlapping with the reinforcing member.

12. The vehicle body side structure according to claim 11, wherein
the reinforcing member has other through holes formed at a top of the hat-like cross section; and
another reinforcing member is provided at a portion where a stress is concentrated due to a side collision in the reinforcing member.

13. The vehicle body side structure according to claim 10, wherein
the reinforcing member is disposed inside a roof side closed cross section formed by the side reinforcing member and an outer panel of the roof side rail;
and the inner panel comprises a discharge port portion that bulges toward the inner side in the vehicle width direction and opens toward the inner side in the vehicle width direction.

14. The vehicle body side structure according to claim 1, wherein
the inner panel comprises a pair of beads and inner panel through holes, the pair of beads are disposed at interval in the front-rear direction of the vehicle body and extending in the vertical direction, and the inner panel through holes are formed in a groove portion between the pair of beads.

* * * * *